United States Patent
Uchida

(10) Patent No.: US 7,879,468 B2
(45) Date of Patent: Feb. 1, 2011

(54) MAGNETIC RECORDING MEDIA AND METHOD OF MANUFACTURE OF THE SAME

(75) Inventor: Shinji Uchida, Matsumoto (JP)

(73) Assignee: Fuji Electric Device Technology Co., Ltd. (JP)

( * ) Notice: Subject to any disclaimer, the term of this patent is extended or adjusted under 35 U.S.C. 154(b) by 60 days.

(21) Appl. No.: 12/041,770

(22) Filed: Mar. 4, 2008

(65) Prior Publication Data
US 2008/0218906 A1 Sep. 11, 2008

(30) Foreign Application Priority Data
Mar. 5, 2007 (JP) .............................. 2007-054546

(51) Int. Cl.
*G11B 5/66* (2006.01)
(52) U.S. Cl. .................................. 428/831.2; 428/832
(58) Field of Classification Search ........................ None
See application file for complete search history.

(56) References Cited

U.S. PATENT DOCUMENTS

| | | | |
|---|---|---|---|
| 5,679,473 A | 10/1997 | Murayama et al. | |
| 7,586,830 B2 * | 9/2009 | Yasui et al. ............. | 369/275.1 |
| 2006/0222905 A1 | 10/2006 | Yasui et al. | |
| 2008/0118780 A1 * | 5/2008 | Kato ........................ | 428/828 |
| 2008/0218906 A1 * | 9/2008 | Uchida ..................... | 360/131 |
| 2009/0123781 A1 * | 5/2009 | Uchida ..................... | 428/827 |

(Continued)

FOREIGN PATENT DOCUMENTS

JP 56-119934 A 9/1981

(Continued)

OTHER PUBLICATIONS

English machine translation of JP 2006-277950, Oct. 2006.*

(Continued)

*Primary Examiner*—Holly Rickman
(74) *Attorney, Agent, or Firm*—Rossi, Kimms & McDowell LLP

(57) ABSTRACT

A magnetic recording medium is disclosed in which there is no degradation of magnetic characteristics at the time of manufacture, such as is seen in proposed discrete-track media or patterned media. The medium can be manufactured by a simple method and results in excellent productivity. Magnetic recording media have a substrate, and, provided thereon in order from the substrate side, are a soft magnetic layer, a crystal orientation control layer, and a magnetic recording layer. The area of at least a portion of the crystal orientation control layer is provided with a depressed portion. Portions of the magnetic layer formed on this depressed portion have a non-granular structure, whereas portions of the magnetic formed on the crystal orientation control layer outside the depressed portion have a granular structure. A method for manufacturing the magnetic recording media is disclosed having a soft magnetic layer formation process of forming a soft magnetic layer on a substrate; a crystal orientation layer formation process of providing a crystal orientation control layer on the soft magnetic layer; a depressed portion formation process of providing a depressed portion in the area of at least a portion of the crystal orientation control layer; and a process of forming a magnetic recording layer on the crystal orientation control layer on which the depressed portion is formed.

13 Claims, 2 Drawing Sheets

U.S. PATENT DOCUMENTS

2009/0123782 A1* 5/2009 Uchida .................. 428/828

FOREIGN PATENT DOCUMENTS

| JP | 01-158617 A | 6/1989 |
| --- | --- | --- |
| JP | 4-310621 A | 11/1992 |
| JP | 2513746 B2 | 4/1996 |
| JP | 08-115519 A | 5/1996 |
| JP | 2003-16622 A | 1/2003 |
| JP | 2003-123239 A | 4/2003 |
| JP | 2003-242623 A | 8/2003 |
| JP | 2006-12285 A | 1/2006 |
| JP | 2006-286158 A | 10/2006 |

OTHER PUBLICATIONS

Oikawa et al.; "High Performance CoPtCrO Single Layered Perpendicular Media with No Recording Demagnetization"; IEEE Trans. Mag.; 2000; vol. 36, 2393; Japan.

Specification and drawings of U.S. Appl. No. 12/268,083 filed Nov. 10, 2008; "Method for Manufacturing Magnetic Recording Media"; Shinji Uchida; specification pp. 1-24; drawings pp. 1-4.

Specification and drawings of U.S. Appl. No. 12/268,047 filed Nov. 10, 2008; "Method for Manufacturing Magnetic Recording Media"; Shinji Uchida; specification pp. 1-22; drawings pp. 1-3.

Notification of Reasons for Refusal issued in corresponding Japanese Patent Application No. 2007-054546 dated Oct. 15, 2010. Partial English Translation provided.

* cited by examiner

MAGNETIC RECORDING MEDIA AND METHOD OF MANUFACTURE OF THE SAME

CROSS REFERENCE TO RELATED APPLICATIONS

This application claims priority from Japanese application Serial No. 2007-054546, filed on Mar. 5, 2007.

BACKGROUND OF THE INVENTION

A. Field of the Invention

This invention relates to magnetic recording media and a method of manufacturing the same, and more specifically relates to perpendicular magnetic recording media and a method of manufacturing the same. This perpendicular magnetic recording media is suitable as discrete-track media, or as patterned media, having satisfactory electromagnetic transducing characteristics and resulting in excellent productivity.

B. Description of the Related Art

Magnetic recording devices have been one type of information recording device providing support for our advanced information-based society in recent years, and as the volume of information handled as grown, there have been demands for higher recording densities in the magnetic recording media used in magnetic recording devices. In order to achieve high recording densities, the units in which magnetization inversions occur must be decreased. To this end, in addition to reducing the size of magnetic particles, it is important that the units of magnetization inversion be clearly separated and partitioned, in order to reduce the magnetic interaction between adjacent recording units.

Perpendicular magnetic recording may be used as a technology to achieve high recording densities, in place of longitudinal magnetic recording. At present, as the material for magnetic recording layers primarily used in perpendicular magnetic recording media, CoCr alloy crystalline films having a hexagonal close-packed (hcp) structure are being studied. The crystal orientation is controlled such that the c-axis is perpendicular to the film of the plane (that is, such that the c plane is parallel to the film plane) to perform perpendicular magnetic recording.

In order to accommodate still higher densities in magnetic recording media, efforts are being made to reduce the sizes of crystal grains forming the CoCr alloy crystalline film, to reduce the grain diameter distribution, and to decrease the magnetic interaction between grains, among other efforts.

A method employing a magnetic layer, generally called a granular magnetic layer, having a structure in which nonmagnetic nonmetal material, such as oxides and nitrides, surrounds the periphery of magnetic crystal grains, is used as one method to control the magnetic structure so as to enable higher densities. In a granular magnetic film, the nonmagnetic nonmetal grain boundary phase physically separates magnetic grains, so that the magnetic interaction between magnetic grains is reduced, and the formation of zigzag domain walls arising in recorded bit transition areas is suppressed, so that low-noise characteristics are obtained.

As the recording layer of perpendicular magnetic recording media, use of a granular magnetic layer has been proposed. For example, in *IEEE Trans. Mag.*, Vol. 36, 2393 (2000), a perpendicular magnetic recording media is described which employs Ru as an underlayer, and CoPtCrO alloy having a granular structure as a magnetic layer. It is stated that as the film thickness of the Ru layer, which is the underlayer below the granular magnetic layer, is increased, the c-axis orientation is improved, and excellent magnetic characteristics and electromagnetic transducing characteristics are obtained as a result.

Further, it has been reported that, by using a CoNiPt target with $SiO_2$ or another oxide added in RF sputtering film deposition, a granular recording film can be formed having a structure in which each magnetic crystal grain is surrounded by nonmagnetic oxides and is individually separated, so that reduced noise can be achieved (see U.S. Pat. No. 5,679,473). In such a granular magnetic film, the nonmagnetic nonmetal grain boundary phase physically separates magnetic particles, so that the magnetic interaction between magnetic particles is reduced. It is thought that by thus suppressing the formation of zigzag domains occurring in recorded bit transition regions, low-noise characteristics can be obtained.

Further, if a crystal orientation controlling layer is provided which has, as the crystal structure, the same hcp structure as the ferromagnetic crystal grains of the magnetic layer, then the Co grains in a magnetic layer formed thereupon will grow corresponding to the crystal properties (crystal grains) of the crystal orientation controlling layer, and oxides will be segregated and grow in the magnetic layer corresponding to the grain boundary porous areas or amorphous areas of the crystal orientation control layer. In other words, it is proposed that magnetic crystal grains be grown epitaxially on the crystal grains of the crystal orientation controlling layer. As a result, by causing the crystal orientation of the crystal orientation controlling layer to be carried over to the magnetic layer and controlling the crystal orientation of the magnetic layer, and moreover by causing amorphous-phase crystal grain boundaries to be formed, intervening on the periphery of crystal grains forming the magnetic layer, the crystal state of a granular-structure magnetic layer can be controlled (see Japanese Patent Laid-open No. 2003-123239 and Japanese Patent Laid-open No. 2003-242623).

Comparatively satisfactory magnetic characteristics and electromagnetic transducing characteristics are obtained from such granular perpendicular magnetic recording media. However, the granular perpendicular magnetic recording media of the past have been so-called "full-coverage films," which are continuous films as shown in FIG. 1. In order to further raise recording densities, there is a need to prevent write blurring into adjacent tracks, reduce formation of zigzag domain walls due to randomly positioned grains, and reduce to the extent possible both the effects of thermal fluctuation as crystal grain sizes are decreased and magnetic interactions between magnetic grains.

Here what is proposed is discrete-track media. To clearly partition magnetization inversion units, here a magnetic line is created which completely cuts off magnetically the intervals between tracks, to artificially obtain boundaries between adjacent tracks. The abovementioned write blurring into adjacent tracks and formation of zigzag domain walls can be eliminated.

In addition, patterned media are attracting attention. Patterned media are the ultimate recoding media, in which islands separated into single magnetic domains, with shape and size artificially adjusted, are arranged in eye shapes, and recording is performed with one such island as one bit.

Various methods have been proposed for such discrete-track media and patterned media. For example, as indicated in FIG. 1 of Japanese Patent Laid-open No. 4-310621, in magnetic recording media having a high-permeability layer and magnetic layer on a substrate, by providing a high-permeability layer and a magnetic layer absence portion between track portions in which recording and reproduction are performed, media is proposed in which intermixing of recordings between tracks during reproduction can be reliably avoided.

Also, as seen in FIG. 1 of Japanese Patent Laid-open No. 56-119934, a method has been proposed for fabricating a magnetic sequence by forming a spiral-shape depressed portion by etching the surface of the disc-shaped substrate prior to media formation, and then embedding the media in the depressed portion.

Further, as seen in FIG. 1 of Japanese Patent No. 2513746, a method has been proposed for fabricating a magnetically isolated magnetic sequence by removing a portion of a soft magnetic layer and instead embedding a nonmagnetic guard band, and forming the magnetic recording layer thereupon.

Further, as seen in FIG. 2 of Japanese Patent Laid-open No. 2003-16622, a method has been proposed for fabricating a magnetic sequence in magnetic recording media comprising, on a nonmagnetic substrate, a soft magnetic layer, a crystal orientation control layer, and a perpendicular magnetic recording layer. In this media a soft magnetic layer has an absence depressed portion, in the area crystal orientation control layer positioned between data tracks and data tracks in which recording and playback are performed, to cause exhibition of discrete action. By filling the depressed portion with nonmagnetic material, a nonmagnetic layer is formed, and the crystal orientation control layer is formed only on places in which the absence depressed portion does not exist in the soft magnetic backing layer, with the magnetic recording layer formed thereupon.

In Japanese Patent Laid-open No. 2006-12285, a magnetic recording media is disclosed which comprises a recording layer divided into numerous recording elements in a prescribed protrusion/depression pattern. There is a substrate, a soft magnetic layer formed on the substrate, and an intermediate layer intervening on the soft magnetic layer. By means of this proposal, crosstalk can be prevented during recording to and reproduction from adjacent tracks, and also worsening of the recording and reproduction characteristics can be prevented through provision of the protrusion/depression pattern.

As explained above, in the discrete-track media and patterned media proposed in the past, a layer which is intentionally removed includes the magnetic layer, substrate, or soft magnetic layer, or both the soft magnetic layer and the crystal orientation control layer.

However, when removing material in the magnetic layer as in Japanese Patent Laid-open No. 4-310621 and Japanese Patent Laid-open No. 2006-12285, the magnetic recording layer itself is directly etched, so that damage to the magnetic recording layer due to etching, as well as corrosion of the magnetic recording layer due to remnant components of the etching gas or etching liquid, cause degradation of magnetic characteristics.

Further, in methods in which a spiral-shaped groove is formed and the groove is filled with a magnetic material to fabricate a magnetic sequence as in Japanese Patent Laid-open No. 56-119934, it is difficult to form a magnetic recording layer only in a minute groove while achieving satisfactory crystal orientation and perpendicular anisotropy, so that satisfactory magnetic characteristics cannot be expected.

Also, flattening processes are provided in which, after removing material from the soft magnetic layer by etching in Japanese Patent No. 2513746, or after removing material from the soft magnetic layer and crystal orientation control layer as in Japanese Patent Laid-open No. 2003-16622, the depressed area is filled with nonmagnetic material, and CMP (chemical-mechanical polishing) or another means is used to flatten the surface. This is because when large irregularities are present in the surface, the magnetic head flying stability worsens. However, it is difficult to fill minute and deep gaps uniformly without leaving any air voids. Further, in the case of minute and deep gaps, irregularities grow larger according to initial irregularities in the surface after filling. Hence, even in cases in which CMP of the surface is performed for flattening, the polishing amount becomes considerable, and film thickness control is not possible.

This invention was devised in consideration of such problems, and has as an object the provision of magnetic recording media in which degradation of magnetic characteristics at the time of fabrication, such as is seen in the discrete-track media and patterned media proposed in the past, does not occur, and which can be manufactured by a simple method and results in has excellent productivity. Thus, the present invention is directed to overcoming or at least reducing the effects of one or more of the problems set forth above.

SUMMARY OF THE INVENTION

In order to attain the above object, magnetic recording media of this invention has a substrate, and, provided on the substrate in order from the substrate side are a soft magnetic layer, a crystal orientation control layer, and a magnetic recording layer. The area of at least a portion of the crystal orientation control layer is provided with a depressed portion, a magnetic layer with a non-granular structure is formed on the depressed portion, and a magnetic layer with a granular structure is formed on the crystal orientation control layer outside the depressed portion.

Further, a method for manufacturing magnetic recording media of this invention has a soft magnetic layer formation process of forming a soft magnetic layer on a substrate, a crystal orientation layer formation process of providing a crystal orientation control layer on the soft magnetic layer, a depressed portion formation process of providing a depressed portion in the area of at least a portion of the crystal orientation control layer, and a process of forming a magnetic recording layer on the crystal orientation control layer on which the depressed portion is formed.

Magnetic recording media of this invention have excellent magnetic characteristics, without the occurrence of degradation in magnetic characteristics at the time of manufacture such as is seen in previously proposed discrete-track media or patterned media. Moreover, magnetic recording media of the invention can be manufactured by a simple method, and so a method for manufacturing magnetic recording media of this invention has excellent productivity.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

The magnetic recording media of the present invention will be described below.

Figure 1:
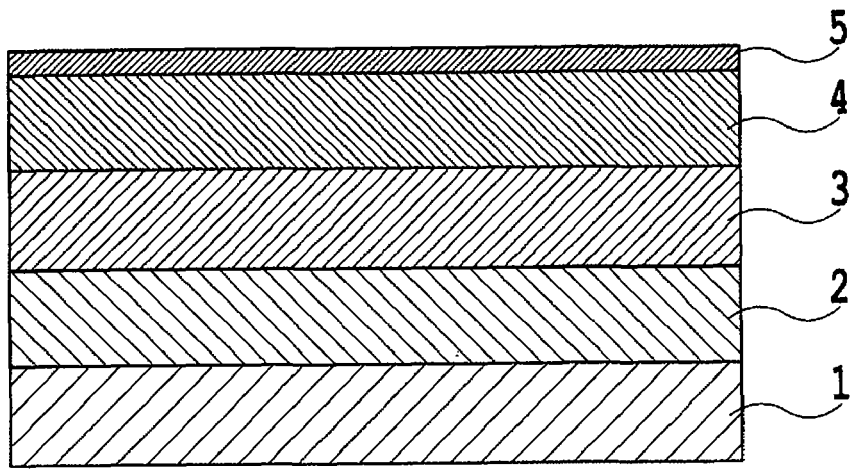
FIG. 1 is a cross-sectional view used to explain a configuration example of a perpendicular magnetic recording medium of the prior art (full-coverage film)
Figure 2:
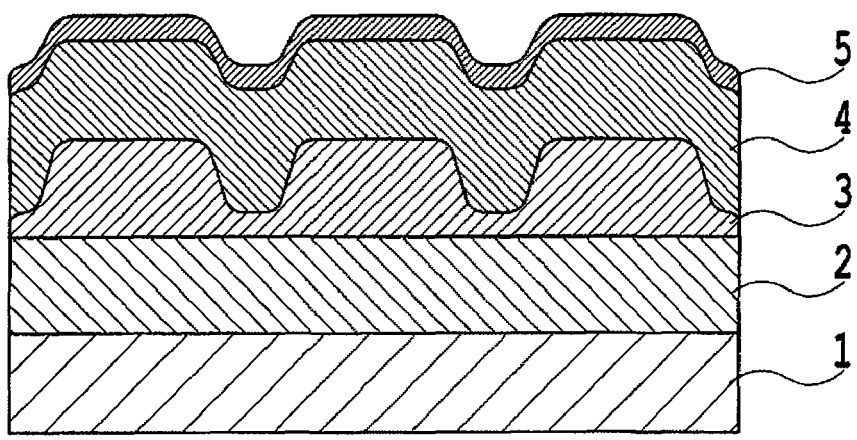
FIG. 2 is a cross-sectional view used to explain a first configuration example of a perpendicular magnetic recording medium of the invention.

FIG. 2 is a cross-sectional view used to explain a first example of the configuration of perpendicular magnetic recording media of the invention. In this perpendicular magnetic recording media, soft magnetic layer 2, crystal orientation control layer 3, magnetic recording layer 4, and protective layer 5 are provided on substrate 1, which is a nonmagnetic substrate.

As substrate 1, an NiP-plated Al alloy, reinforced glass, crystallized glass, or similar, normally used in magnetic recording media, can be employed. Soft magnetic layer 2 is provided in order to concentrate the magnetic flux generated by the magnetic head and to form a sharp magnetic field gradient in the magnetic recording layer. Soft magnetic layer 2 can employ an NiFe system alloy, Sendust (FeSiAl) alloy, or a similar material, but by using an amorphous Co alloy, such as for example CoNbZr or CoTaZr or similar, satisfactory electromagnetic transducing characteristics can be obtained. The optimum value of the film thickness of soft magnetic layer 2 depends on the structure and characteristics of the magnetic head used in magnetic recording, but from the standpoint of productivity when manufacturing the media, a thickness of 10 nm or greater and 300 nm or less is desirable.

Crystal orientation control layer 3 is provided to appropriately control the crystal orientation, crystal grain diameters, and grain boundary segregation in magnetic recording layer 4. In order to appropriately control the crystal orientation of magnetic recording layer 4, the surface of crystal orientation control film 3 on the side facing magnetic recording layer 4 comprises Ru or an Ru alloy having the hcp crystal structure. It is particularly desirable that the mutually separated Ru crystals be separated to an extent enabling the separate growth of individual magnetic layers growing thereupon without being linked to adjacent magnetic layer crystals.

When a crystal orientation control layer is formed using Ru or an Ru alloy, the Ru crystals grow with formed grain boundaries. That is, numerous Ru crystals grow perpendicularly, or in other words, crystal growth is from the side facing the soft magnetic layer toward the side facing the magnetic recording layer. These Ru crystals gradually become narrower in moving from the side facing the soft magnetic layer toward the side facing the magnetic recording layer, and the spaces between adjacent crystals gradually expand.

When a magnetic recording layer is formed on this crystal orientation control layer, the magnetic crystals grow on the Ru crystals. When the Ru or Ru alloy layer (hereafter called the "Ru layer") is of an appropriate thickness, Ru crystals are formed having an appropriate spacing with adjacent Ru crystals at the surface on the side of the magnetic recording layer of the Ru layer. When magnetic recording layer 4 is formed on crystal orientation control layer 3 with such a configuration, perpendicularly oriented magnetic crystal grains are formed on the Ru crystals, and amorphous material, such as of oxides or nitrides, is formed on the periphery of these magnetic crystal grains, so that a magnetic layer comprising granular material (hereafter called a "granular magnetic layer") is formed.

If the Ru layer is thinner than the appropriate thickness, the width between adjacent Ru crystals in the Ru layer face on the side of the magnetic recording layer is narrow, and magnetic crystals formed on the Ru crystals make contact with neighboring crystals to become integrated, so that granular crystals are no longer formed. If the Ru layer is too thick, the Ru crystal separation advances, but the proportion of the grain boundary layer increases, and magnetic characteristics tend to decline.

The lower limit to the film thickness of crystal orientation control layer 3 enabling formation of granular crystals differs depending on whether the film comprises Ru alone or an Ru alloy, and depends on the composition of the Ru alloy. For the case of Ru alone the limit is 5 nm, and for an Ru alloy the limit is 5 to 30 nm, depending on the composition. Although differing according to whether the film is Ru alone or an Ru alloy composition, and differing depending on the granular crystal grain diameters of magnetic recording layer 4 formed thereupon and on the thickness of the encompassing nonmagnetic grain boundary, as the optimum value for the film thickness of crystal orientation control layer 3, it is desirable that the thickness be controlled within the range of 5 nm or greater and 50 nm or less.

A depressed portion is provided in the area of at least a portion of crystal orientation control layer 3. That is, when the magnetic recording media is discrete-track media, the depressed portion is provided in portions dividing recording tracks in the recording track area, and in portions dividing pattern areas into patterns in which servo signals are recorded. And, when the magnetic recording media is patterned media, the depressed portion is provided in portions dividing areas into patterns corresponding to bits. The placement of the depressed portion differs with the recording density. For example, the recording track pitch for 500 Gbit/inch$^2$ discrete-track media is 60 nm, and pits in 1 Tbit/inch$^2$ patterned media are fabricated with a pitch of 25 nm.

In the example of FIG. 2, in the portion of crystal orientation control layer 3 in which the depressed portion is formed, there is only a partial absence in the thickness direction of crystal orientation control layer 3. In the depressed portion, the crystal orientation control layer is shallow, and mutually adjacent crystal orientation control layer portions on either side of a depressed portion are connected via this bottom portion. From the standpoint of overall film thickness design, when crystal orientation control layer 3 is thick, this enables formation of non-granular magnetic recording portions on the depressed portion, even when the depressed portion does not create a complete absence of crystal orientation control layer 3. In other words, if the thickness of the depressed portion of crystal orientation control layer 3 is less than the above lower limit, then granular crystals are no longer formed in the magnetic recording layer formed on the depressed portion. When crystal orientation control layer 3 is thick, if the depressed portion results in complete absence of crystal orientation control layer 3, then depressions and protrusions of magnetic recording layer 4 and protective layer 5 formed thereupon become large, and there is the possibility that head flight stability may be worsened. For this reason, when the overall film thickness is large and depressions/protrusions become prominent, it is preferable that only a portion of the film be absent in the thickness direction, and that adjacent crystal orientation control layer portions on either side of the depressed portion in the crystal orientation control layer be connected via the bottom portion.

When, as shown in FIG. 2, only a portion of crystal orientation control layer 3 in the thickness direction is absent, and the crystal orientation control layer remains present below the depressed portion, it is preferable that the surface of the bottom of the depressed portion of the crystal orientation control layer comprise a material not containing Ru or an Ru alloy. Alternatively, when comprising Ru or an Ru alloy, it is preferable that either Ru crystals are formed which are not mutually separated by a grain boundary layer, or that even when separated by a grain boundary layer, that the separation be such that the magnetic layer crystals grown thereupon can grow separately and individually without being linked to adjacent magnetic layer crystals. When Ru or an Ru alloy is comprised, the above-described structure can be obtained, as explained above, by reducing the thickness of the Ru layer to less than the appropriate thickness, such as for example less than 5 nm. The entirety of the crystal orientation control layer may comprise Ru or an Ru alloy, but a layered structure may be employed in which the magnetic recording layer side may comprise Ru or an Ru alloy, while the layer beneath comprises a material not containing Ru or an Ru alloy. In forming the depressed portion, it is preferable that the depth of the depressed portion be such as to extend to the layer comprising material not containing Ru or an Ru alloy.

Figure 4:
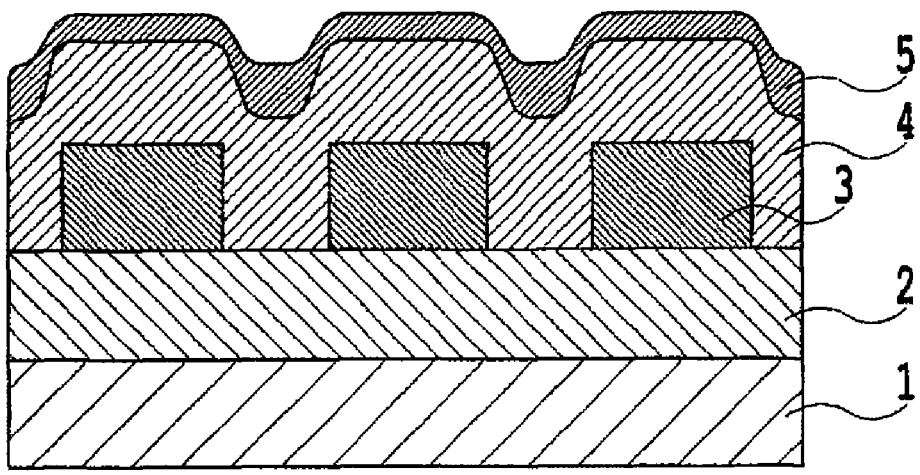
FIG. 4 is a cross-sectional view used to explain a second configuration example of a perpendicular magnetic recording medium of the invention.

FIG. 4 is a cross-sectional view used to explain a second configuration example of perpendicular magnetic recording medium of the invention. The magnetic recording medium comprises, on substrate 1, soft magnetic layer 2, crystal orientation control layer 3 having a depressed portion, magnetic recording layer 4, and protective layer 5. The depressed portion of crystal orientation control layer 3 is formed such that all of the crystal orientation control layer in the thickness direction is absent, and the bottom of the depressed portion is formed from the layer formed below the crystal orientation control layer, so that adjacent crystal orientation control layer areas on either side of the depressed portion are not connected by the bottom portion. From the standpoint of overall film thickness design, when crystal orientation control layer 3 is thin, even if the depressed portion of crystal orientation control layer 3 results in complete absence, the protrusions/depressions in magnetic recording layer 4 and protective layer 5 formed thereupon are small, and there is no worsening of head flight stability. Hence the depressed portion of crystal orientation control layer 3 may result in complete absence of the layer. In this case, there is increased process stability during etching, and the recording/reproduction characteristics of the magnetic recording media can easily be made stable. When the entire crystal orientation control layer is absent in the thickness direction in the depressed portion, the crystal orientation control layer may be a single layer not comprising Ru or an Ru alloy.

FIG. 2 and FIG. 4 are examples of configurations in which the depressed portions of crystal orientation control layer 3 and magnetic recording layer 4 are not filled with a nonmagnetic layer, and are not flattened. When a portion of crystal orientation control layer 3 in the thickness direction is absent, and there is a partial connection with the adjacent crystal orientation control layer, protrusions/depressions in the surface can be reduced, so that head flight stability can be secured, and flattening is unnecessary. Also, even when the crystal orientation control layer is completely absent in the thickness direction, depending on the overall film thickness and the required magnetic characteristics, the required crystal orientation control layer can be made thin, so that even when not filled with a nonmagnetic layer and not flattened, stable head flight can be obtained.

Figure 3:
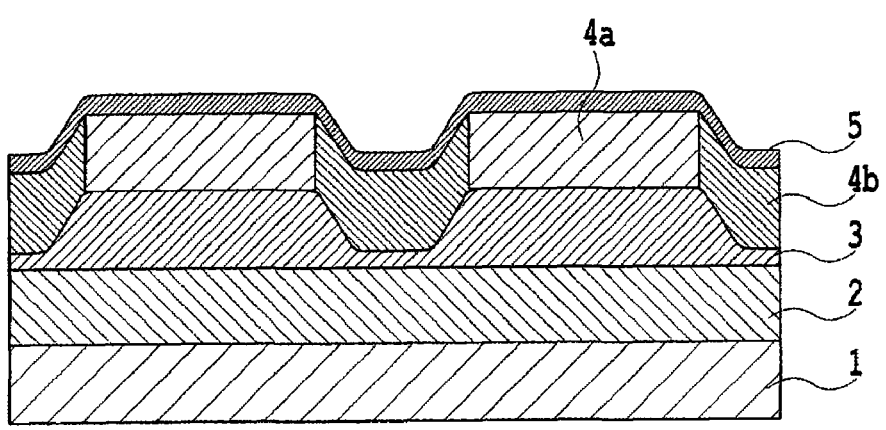
FIG. 3 is a cross-sectional view used to explain in detail a first configuration example of a perpendicular magnetic recording medium of the invention.

Magnetic recording layer 4 is formed on crystal orientation control layer 3 along the protrusions/depressions thereof. At this time, as shown in FIG. 3, magnetic recording layer 4 is divided into portions having two magnetic characteristics. One portion is the magnetic recording layer above the protruding portion of crystal orientation control layer 3, which is the so-called perpendicularly oriented granular magnetic layer 4a, comprising crystal grains having ferromagnetism and the nonmagnetic grain boundaries surrounding these crystal grains. On the other hand, the other portion is magnetic recording layer 4b formed on the depressed portion of crystal orientation control layer 3, which is magnetic layer 4b comprising non-granular material (hereafter called the "non-granular magnetic layer"), in which crystal grains having ferromagnetism and nonmagnetic grain boundaries are intermixed, and crystal grains are not surrounded by nonmagnetic grain boundaries. Granular magnetic layer 4a has normal magnetic recording characteristics. On the other hand, non-granular magnetic layer 4b has low-permeability soft magnetic characteristics, and can prevent write blurring in adjacent tracks, reduce formation of zigzag domain walls, reduce the effects of thermal fluctuations, and reduce magnetic interactions between magnetic grains and similar. Such a magnetic recording layer 4 having granular magnetic layer 4a and non-granular magnetic layer 4b is formed using material which can form crystal grains having the ferromagnetism of granular magnetic layer 4a, and material which can form nonmagnetic grain boundaries.

As material forming crystal grains having ferromagnetism in granular magnetic layer 4a with such a structure, CoCr system alloys are suitable. In particular, CoCr alloys with at least one element among Pt, Ni, Ta, and B added are desirable for the purpose of obtaining excellent magnetic characteristics and recording/reproduction characteristics. Further, as materials forming the nonmagnetic grain boundaries of granular magnetic layer 4a, an oxide of at least one element among Cr, Co, Si, Al, Ti, Ta, Hf, and Zr is desirable in order to form a stable granular structure.

It is desirable that the thickness of magnetic recording layer 4 be 10 nm or greater and 60 nm or less. When the film thickness is less than 10 nm, adequate signal characteristics for use as a magnetic recording layer are not obtained, and in order to increase the recording/reproduction resolution, a thickness of less than 60 nm is necessary.

As protective layer 5, a protective film widely used in the prior art, such as for example a protective film mainly comprising carbon, $ZrO_2$, $SiO_2$, or similar material, can be used. It is desirable that the film thickness be 1 nm or greater and 10 nm or less. If the film is less than 1 nm thick, pinholes may form, and durability may suffer. When the thickness is greater than 10 nm, the distance to the head increases, and magnetic signals read by the head become too weak.

Further, although not shown, it is desirable that a liquid lubricant layer be formed on protective layer 5. As the liquid lubricant layer, a material generally used in the prior art, such as for example a perfluoropolyether lubricant, can be used. As for the film thickness and other conditions, the various conditions normally used in magnetic recording media can be employed without modification.

Next, a method for manufacturing magnetic recording media of the invention is explained.

A method for manufacturing magnetic recording media of the invention has a soft magnetic layer formation process of forming soft magnetic layer 2 on substrate 1. A sputtering method can be used to form the soft magnetic layer, but other methods can be used as well, and any formation method which can be used to form a soft magnetic layer of magnetic recording media can be employed.

This method for manufacturing magnetic recording media of the invention has a crystal orientation control layer formation process of forming crystal orientation control layer 3 on soft magnetic layer 2 formed in the soft magnetic layer formation process. A sputtering method also can be employed to form crystal orientation control layer 3, but other methods can be used as well, and any formation method which can be used to form a crystal orientation control layer of magnetic recording media can be employed.

This method for manufacturing magnetic recording media of the invention has a depressed portion formation process of providing a depressed portion in the area of at least a portion of crystal orientation control layer 3 formed in this way. In forming this depressed portion, a resist layer is provided on the entire surface of crystal orientation control layer 3, and this is patterned using a UV nano-imprint method so as to obtain a prescribed pattern. That is, a mold with the inverse pattern of the pattern of the depressed portion to be formed is used in UV nano-imprinting, to obtain a hardened resist pattern. Then, by etching crystal orientation control layer 3 according to the resist pattern, the depressed portion can be formed.

As explained above, the depressed portion crystal orientation control layer 3 may result in an absence over the entire depth direction of the crystal orientation control layer, or may result in a partial absence in the depth direction of crystal orientation control layer 3. The advantages of these respective configurations have been described above.

This method for manufacturing magnetic recording media of the invention has a magnetic recording layer formation process of forming magnetic recording layer 4 on the substrate having a crystal orientation control layer provided with a depressed portion in the area of at least a portion thereof, formed in this way. Magnetic recording layer 4 is formed by using the above-described magnetic recording layer formation material to form a magnetic recording layer over the entire surface of the substrate having a crystal orientation control layer provided with a depressed portion. The magnetic recording layer can also be formed using a sputtering method, but other methods may be used, and any method which enables formation of the magnetic recording layer of the magnetic recording media can be employed.

In the magnetic recording layer formed on the crystal orientation control layer, granular magnetic layer 4a is formed, and normal magnetic characteristics can be obtained. On the other hand, what is formed on the depressed portion is non-granular, with soft magnetic characteristics and low permeability.

A process may as necessary be provided to provide protective layer 5 on magnetic recording layer 4 configured in this way, and moreover a process to provide a lubricant layer on protective layer 5 may be provided. The protective layer may be primarily of carbon. When diamond-like carbon is used, a chemical vapor phase growth method or physical vapor phase growth method may be used in film formation. When the lubricant layer is a liquid lubricant layer, a dipping method may be used to form the layer.

EMBODIMENTS

Below, embodiments of the invention are explained. The following embodiments are merely examples used in appropriate explanations of the invention, and do not limit the scope of the invention in any way. Further, in these embodiments, discrete-track media is employed in explanations, but for patterned media as well, the configuration of this invention may be fabricated using the same processes.

Embodiment 1

In the perpendicular magnetic recording media configuration shown in FIG. 2, a chemically reinforced glass substrate with smooth surface (for example, HOYA N-5 glass substrate) was used as substrate 1, and a sputtering film deposition method was used to deposit soft magnetic layer 2 comprising CoZrNb to a thickness of 200 nm. NiFeNb and Ru were deposited to a depth of 3 nm and 14 nm, respectively, as crystal orientation control layer 3.

Next, a spin coater was used to form a UV-curing resist on the substrate on which the Ru had been deposited, and UV nano-imprinting was used for patterning. Specifically, a quartz mold was prepared having a protrusion/depression pattern comprising lines and spaces in concentric circles with a 100 nm pitch, equivalent to the inverse pattern of the track pattern, that is, with depressions as the track portions and protrusions as the track demarcations, and having an island-shape protrusion/depression pattern equivalent to the inverted pattern of the servo portion. This quartz mold was pressed against the substrate on which a resist film was formed, and by irradiating with UV light through the quartz mold, the resist was adequately hardened, after which the mold was released. By this means, the resist was patterned so as to have lines and spaces equivalent to tracks with a 100 nm pitch.

Next, reactive ion etching (RIE) was used to etch crystal orientation control layer 3 along the resist pattern, to form a depression of depth 10 nm at prescribed positions in crystal orientation control layer 3. Specifically, in the RIE equipment, etching was performed using $CO+NH_3$ gas. Etching was performed at a gas flow rate of 100 sccm, background vacuum of 1 Pa, source power of 500 W, and bias power of 250 W.

Next, sputter film deposition was used to deposit magnetic recording layer 4 comprising $CoCrPt—SiO_2$ of thickness 30 nm, and sputter film deposition was used to deposit carbon protective layer 5 of thickness 5 nm.

Then, a dipping method was used to form a 2 nm liquid lubricant layer of perfluoropolyether, to obtain the perpendicular magnetic recording media. In FIG. 2, the liquid lubricant layer is not shown.

The head flight performance of magnetic recording media obtained in this way was confirmed. In head flight tests using a commercial perpendicular magnetic recording head, stable head flight was possible without contact with the magnetic recording media or the occurrence of resonance.

In addition, recording/reproduction characteristics were evaluated. As a result, it was confirmed that for all magnetic recording media, at a track-direction recording density of 254 kTPI, a difference in signal characteristics between data track portions and data track demarcation portions could be confirmed, and magnetic separation between neighboring data tracks was confirmed.

Embodiment 2

A 2 nm film of NiFeNb and 12 nm of Ru metal were deposited as crystal orientation control layer 3. Then, RIE was used to etch the crystal orientation control layer, and the entire crystal orientation control layer in the depth direction was removed. Otherwise, conditions similar to those of Embodiment 1 were used to fabricate the magnetic recording media. Similarly to Embodiment 1, head flight performance tests were performed and recording/reproduction characteristics were evaluated. As a result, excellent performance, more or less the same as for the magnetic recording media obtained in Embodiment 1, were observed.

Comparison Example 1

When using RIE in etching of the crystal orientation control layer, all of the crystal orientation control layer in the depth direction was removed, and moreover the underlying soft magnetic layer was removed, otherwise the same conditions as in Embodiment 1 were used to fabricate magnetic recording media.

Head flight performance of this magnetic recording media was observed. As a result, in head flight tests using a commercially available perpendicular magnetic recording head, contact with the magnetic recording media and resonance occurred, and stable head flight was not possible. Moreover, satisfactory recording/reproduction characteristics could not be obtained.

From the contrast between the recording/reproduction evaluations of Embodiments 1 and 2 and of Comparison Example 1, it is thought in magnetic recording media of this invention, by reducing pattern scales, still higher recording densities can be accommodated.

A flattening process was not employed in media fabrication in Embodiments 1 and 2. Despite this fact, excellent magnetic head flight characteristics were observed.

As explained above, the magnetic recording media of this invention exhibit excellent characteristics, and can accommodate still higher recording densities. By means of a method for manufacturing magnetic recording media of this invention, media can be fabricated by a simple method without causing degradation of magnetic characteristics at the time of fabrication. In particular, there are few protrusions/depressions, so that a flattening process can itself be rendered unnecessary and a perpendicular magnetic recording media can be provided which results in excellent productivity and has excellent characteristics as well.

Thus, a magnetic recording media and method of manufacture of the same have been described according to the present invention. Many modifications and variations may be made to the techniques and structures described and illustrated herein without departing from the spirit and scope of the invention. Accordingly, it should be understood that the media and methods described herein are illustrative only and are not limiting upon the scope of the invention.

What is claimed is:

1. A magnetic recording medium, comprising:
   a substrate,
   a soft magnetic layer on the substrate,
   a crystal orientation control layer on the soft magnetic layer comprising a depressed portion in which at least a portion of the crystal orientation control layer is absent, and
   a magnetic recording layer on the crystal orientation layer
   wherein portions of the magnetic recording layer in the depressed portion of the crystal orientation layer have a non-granular structure and portions of the magnetic recording layer on portions of the crystal orientation control layer that are not depressed have a granular structure,
   wherein the depressed portion of the orientation control layer which is absent does not extend in depth to the surface of the soft magnetic layer, so that part of the orientation control layer remains in the depressed portion and wherein the surface of the crystal orientation control layer in portions that are not depressed and that are in contact with the magnetic recording layer comprises Ru or an Ru alloy having Ru crystals mutually separated by a grain boundary layer, the Ru crystals being mutually separated to an extent that the magnetic layer overlying the Ru or Ru alloy having Ru crystals has a granular structure.

2. The magnetic recording medium according to claim 1, wherein the part of the orientation control layer that remains in the depressed portion comprises a material not comprising Ru or an Ru alloy.

3. The magnetic recording medium according to claim 1, wherein the part of the orientation control layer that remains in the depressed portion comprises Ru or an Ru alloy in which Ru crystals are formed which either (i) are not mutually separated by a grain boundary layer, or (ii) are separated by a grain boundary layer in which the separation is such that magnetic layer crystals grown thereon can grow separately and individually without being linked to adjacent magnetic layer crystals.

4. The magnetic recording medium according to claim 1, wherein the surface of the crystal orientation control layer in portions that are not depressed and that are in contact with the magnetic recording layer comprises Ru or an Ru alloy having Ru crystals mutually separated by a grain boundary layer, the magnetic layer has a granular structure, and the part of the orientation control layer that remains in the depressed portion comprises Ru or an Ru alloy having Ru crystals not mutually separated by a grain boundary layer.

5. The magnetic recording medium according to claim 1, wherein the surface of the crystal orientation control layer in portions that are not depressed and that are in contact with the magnetic recording layer comprises Ru or an Ru alloy having Ru crystals mutually separated by a grain boundary layer, the magnetic layer has a granular structure, and the part of the orientation control layer that remains in the depressed portion comprises Ru or an Ru alloy having Ru crystals mutually separated by a grain boundary layer.

6. The magnetic recording medium according to claim 1, wherein a material not comprising Ru or an Ru alloy partially fills the depressed portion.

7. The magnetic recording medium according to claim 1, wherein part of the crystal orientation control layer partially fills the depressed portion and connects adjacent crystal orientation control layer areas.

8. A magnetic recording medium, comprising:
   a substrate,
   a soft magnetic layer on the substrate,
   a crystal orientation control layer on the soft magnetic layer comprising a depressed portion in which at least a portion of the crystal orientation control layer is absent, and
   a magnetic recording layer on the crystal orientation layer
   wherein portions of the magnetic recording layer in the depressed portion of the crystal orientation layer have a non-granular structure and portions of the magnetic recording layer on portions of the crystal orientation control layer that are not depressed have a granular structure,
   wherein a material that is not part of the crystal orientation control layer partially fills the depressed portions, and adjacent crystal orientation control layer areas are not connected across the depressed portion by material of the crystal orientation control layer.

9. A method for manufacturing magnetic recording medium which comprises a substrate, and, provided thereupon in order from the substrate side, a soft magnetic layer, a crystal orientation control layer, and a magnetic recording layer, and in which a depressed portion is provided in the area of at least a portion of the crystal orientation control layer, a magnetic layer with a non-granular structure is formed on the depressed portion, and a magnetic layer with a granular structure is formed on the crystal orientation control layer outside the depressed portion, comprising:
   providing a substrate;
   forming a soft magnetic layer on the substrate;
   providing a crystal orientation control layer on the soft magnetic layer;
   forming a depressed portion in the area of at least a portion of the crystal orientation control layer; and forming a magnetic recording layer on the crystal orientation control layer in which the depressed portion is formed, wherein the surface of the crystal orientation control layer in portions that are not depressed and that are in contact with the magnetic recording layer comprises Ru or an Ru alloy having Ru crystals mutually separated by a grain boundary layer, the Ru crystals are mutually separated to an extent that magnetic layer crystals growing thereon can grow to a granular structure, and the bottom portion of the depressed portion comprises a material not comprising Ru or an Ru alloy.

10. A method for manufacturing magnetic recording medium which comprises a substrate, and, provided thereupon in order from the substrate side, a soft magnetic layer, a crystal orientation control layer, and a magnetic recording layer, and in which a depressed portion is provided in the area of at least a portion of the crystal orientation control layer, a magnetic layer with a non-granular structure is formed on the depressed portion, and a magnetic layer with a granular structure is formed on the crystal orientation control layer outside the depressed portion, comprising:

providing a substrate;

forming a soft magnetic layer on the substrate;

providing a crystal orientation control layer on the soft magnetic layer;

forming a depressed portion in the area of at least a portion of the crystal orientation control layer; and forming a magnetic recording layer on the crystal orientation control layer in which the depressed portion is formed, wherein the surface of the crystal orientation control layer in portions that are not depressed and that are in contact with the magnetic recording layer comprises Ru or an Ru alloy having Ru crystals mutually separated by a grain boundary layer, the Ru crystals are mutually separated to an extent that magnetic layer crystals growing thereupon can grow to a granular structure, and the bottom portion of the depressed portion comprises Ru or an Ru alloy having Ru crystals not mutually separated by a grain boundary layer.

11. A method for manufacturing magnetic recording medium which comprises a substrate, and, provided thereupon in order from the substrate side, a soft magnetic layer, a crystal orientation control layer, and a magnetic recording layer, and in which a depressed portion is provided in the area of at least a portion of the crystal orientation control layer, a magnetic layer with a non-granular structure is formed on the depressed portion, and a magnetic layer with a granular structure is formed on the crystal orientation control layer outside the depressed portion, comprising:

providing a substrate;

forming a soft magnetic layer on the substrate;

providing a crystal orientation control layer on the soft magnetic layer;

forming a depressed portion in the area of at least a portion of the crystal orientation control layer; and forming a magnetic recording layer on the crystal orientation control layer in which the depressed portion is formed, wherein the surface of the crystal orientation control layer in portions that are not depressed and that are in contact with the magnetic recording layer comprises Ru or an Ru alloy having Ru crystals mutually separated by a grain boundary layer, the Ru crystals are mutually separated to an extent that magnetic layer crystals growing thereupon can grow to a granular structure, and the bottom portion of the depressed portion comprises Ru or an Ru alloy having Ru crystals not separated to an extent that the magnetic layer crystals growing thereupon can grow to a granular structure while Ru crystals are separated by the grain boundary layer.

12. The method for manufacturing magnetic recording medium according to claim 9, wherein a bottom portion of the depressed portion is formed by the crystal orientation control layer, and adjacent crystal orientation control layer areas with the depressed portion of the crystal orientation control layer intervening are connected by the bottom portion.

13. A method for manufacturing magnetic recording medium which comprises a substrate, and, provided thereupon in order from the substrate side, a soft magnetic layer, a crystal orientation control layer, and a magnetic recording layer, and in which a depressed portion is provided in the area of at least a portion of the crystal orientation control layer, a magnetic layer with a non-granular structure is formed on the depressed portion, and a magnetic layer with a granular structure is formed on the crystal orientation control layer outside the depressed portion, comprising:

providing a substrate;

forming a soft magnetic layer on the substrate;

providing a crystal orientation control layer on the soft magnetic layer;

forming a depressed portion in the area of at least a portion of the crystal orientation control layer; and forming a magnetic recording layer on the crystal orientation control layer in which the depressed portion is formed, wherein the bottom portion of the depressed portion is formed by a layer formed below the crystal orientation control layer, and adjacent crystal orientation control layer areas with the depressed portion of the crystal orientation control layer intervening are not connected by the bottom portion.

* * * * *